US011268490B2

(12) United States Patent
Pedersen (10) Patent No.: US 11,268,490 B2
(45) Date of Patent: Mar. 8, 2022

(54) METHOD AND AN ASSEMBLY FOR HANDLING WIND TURBINE BLADES

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 274 days.

(21) Appl. No.: 16/468,422

(22) PCT Filed: Dec. 4, 2017

(86) PCT No.: PCT/DK2017/050404
§ 371 (c)(1),
(2) Date: Jun. 11, 2019

(87) PCT Pub. No.: WO2018/113866
PCT Pub. Date: Jun. 28, 2018

(65) Prior Publication Data
US 2020/0332761 A1    Oct. 22, 2020

(30) Foreign Application Priority Data

Dec. 23, 2016    (DK) .......................... PA 2016 00793

(51) Int. Cl.
*F03D 1/06*    (2006.01)
*F03D 13/10*    (2016.01)
*B66C 23/20*    (2006.01)

(52) U.S. Cl.
CPC .......... *F03D 1/0658* (2013.01); *B66C 23/207* (2013.01); *F03D 13/10* (2016.05);
(Continued)

(58) Field of Classification Search
CPC ..... F03D 1/0658; F03D 13/10; B66C 23/207; F05B 2230/604; F05B 2230/61; F05B 2230/70; F05B 2240/916
See application file for complete search history.

(56) References Cited

U.S. PATENT DOCUMENTS

2015/0345465 A1* 12/2015 Westergaard ........... F03D 13/40
29/889.21
2016/0069321 A1* 3/2016 Neumann ............... F03D 13/40
414/800
2016/0138561 A1 5/2016 Hoffmann et al.

FOREIGN PATENT DOCUMENTS

CN    102782311 A    11/2012
EP    1925582 A1    5/2008
(Continued)

OTHER PUBLICATIONS

European Patent Office, International Search Report and Written Opinion in PCT Application No. PCT/DK2017/050404, dated Feb. 14, 2018.
(Continued)

*Primary Examiner* — Moshe Wilensky
(74) *Attorney, Agent, or Firm* — Wood Herron & Evans LLP (57) ABSTRACT

A method and a lifting arrangement for mounting a blade on a wind turbine rotor carried by a wind turbine structure. The method comprises providing a control line guide at the wind turbine structure, the control line guide forming a control line point configured to restrain the control line attaching the control line to the control line point; lifting the blade with an external blade lifting crane while a root end of the blade is guided towards the rotor by use of said control line restrained at said control line point, and connecting said blade to said rotor.

19 Claims, 6 Drawing Sheets

(52) U.S. Cl.
CPC ..... *F05B 2230/604* (2013.01); *F05B 2230/61* (2013.01); *F05B 2230/70* (2013.01); *F05B 2240/916* (2013.01)

(56) References Cited

FOREIGN PATENT DOCUMENTS

| | | |
|---|---|---|
| EP | 2538073 A2 | 12/2012 |
| EP | 2868914 A1 | 5/2015 |
| EP | 2952733 A1 | 12/2015 |
| WO | 2011082710 A1 | 7/2011 |
| WO | 2014082176 A1 | 6/2014 |
| WO | 2017220459 A1 | 12/2017 |

OTHER PUBLICATIONS

Danish Patent and Trademark Office, Search and Examination Report in PA 2016 00793, dated May 16, 2017.
China National Intellectual Property Administration, First Notification of Office Action in CN Application No. 201780079671.3, dated Mar. 19, 2020.
Intellectual Property India, Examination Report in IN Application No. 201917027421, dated Feb. 4, 2021.
European Patent Office, Examination Report in EP Application No. 17811839.4, dated Jul. 1, 2021.

* cited by examiner

METHOD AND AN ASSEMBLY FOR HANDLING WIND TURBINE BLADES

In wind turbines, wind energy is converted into mechanical energy by blades carried by a hub. The hub is carried by a shaft, which rotates in response to the energy conversion. The size and weight of the wind turbine tower, blades, and drive train have increased over the years and handling during transport and erection of the wind turbines has become more and more challenging.

Modern-day wind turbines may include towers more than 100 meters tall when installed. A hub, a nacelle, blades, and various components to be housed within the nacelle (e.g., a gearbox and generator) must be raised to this level. One conventional approach for lifting such components includes using a mobile crane, such as a truck-mounted or independently-movable, lattice-boom crane. Mobile cranes are commonly used because of their versatility and ability to be assembled at wind turbine sites, which are often located in remote areas, and moved around at the sites once assembled.

The lifting height and capacity of mobile cranes are limited. Existing tower heights are already a challenge for mobile crane technology, and even when large and expensive lifting equipment is available, difficulties may remain in particular related to assembly operations requiring precise alignment of heavy or large components, particularly in strong wind conditions, or at sea where the lifting crane is typically on a barge which is subject to waves etc. When assembling the blades to the hub, precise alignment of a plurality of bolts relative to a bolted flange is necessary, and due to the large dimensions, even a relative small displacement of the blade relative to the hub may create a large disposition of the bolts relative to the receiving flange.

Accordingly, not only the availability of the cranes becomes a concern. Resources are also required to align and assemble the wind turbine components at the site where the wind turbine is erected.

Generally, the need for lifting components, particularly for maintenance, has been addressed by installing lifting equipment at the top of wind turbine tower. Such equipment may e.g. lift spare parts into the interior of the nacelle, e.g. through an opening in the floor of the nacelle. The lifting capacity of such equipment is typically limited to 30-40 tons or less.

As can be appreciated, new devices and methods for raising and aligning components at the top of a wind turbine tower are highly desirable.

Accordingly, in view of the present disclosure, a method is provided for mounting a blade on a wind turbine rotor which is carried by a wind turbine structure. The method comprises:

providing a control line guide at the wind turbine structure, the control line guide forming a control line point;

attaching a control line between the control line point and the blade;

using an external blade lifting crane to carry at least a part of the blade while a root end of the blade is guided towards the rotor by use of said control line, and connecting said blade to said rotor.

Since the blade is lifted at least partly by an external blade lifting crane, at least a part of the weight of the blade is carried without loading the wind turbine structure, i.e. without loading the nacelle, or tower, or other wind turbine structures.

Since the control line controls the position of the root end of the blade while the blade is lifted, the positioning procedure becomes fast and the duration where the external blade lifting crane is needed can be reduced. Furthermore, the control over the position of the blade may increase. Accordingly, an improved efficiency and a safer and easier working process can be obtained.

The control line guide forms a control line point at which the control line can be restrained. The control line point may e.g. constitute a permanent fixing of the control line where the control line is prevented from moving relative to the control line point. Alternatively, the control line point may constitute a semi-permanent fixing in which the control line may move relative to the control line point. In one embodiment of a semi-permanent fixing, the control line is allowed to slide longitudinally relative to the control line point and in one embodiment, the control line is allowed to be released completely from the control line point, e.g. by pulling in a specific direction to thereby allow easy detachment. In one embodiment of the semi-permanent fixing, the control line point is configurable between a fixed configuration where the control line is completely fixed at the control line point and a released configuration where the control line can move longitudinally relative to the control line point and a loose configuration where the control line can be pulled out of the control line point. The released configuration may further be provided with different levels of resistance against sliding.

The control line guide may e.g. be attached directly to an outer surface of the wind turbine structure, e.g. to the nacelle, e.g. to the roof of the nacelle, or to a surface facing towards the rotor, or to a lower surface of the nacelle. Alternatively, the control line guide is attached directly to the rotor, or to the tower which carries the nacelle.

The control line guide could be attached to an attachment location of the wind turbine structure and the control line guide could be configurable to allow repositioning of the control line point relative to the attachment location. This could allow better control over the point towards which the blade root is pulled by use of the control line. The position of the control line point could be changed during the lifting of the blade to thereby compensate e.g. for changing wind direction, or simply to improve the control over the blade position during lifting.

The external blade lifting crane may carry the entire weight of the blade, or the control line guide may be configured to carry a part of the weight of the blade.

The external blade lifting crane is a crane which is not carried by the wind turbine structure but carried on ground or sea.

The weight of the blade may be carried mainly by the blade lifting crane. In one example, the blade lifting crane caries more than 50 pct., or even more than 75 pct. of the weight, e.g. more than 80, 85, 90 or 95 pct. of the weight of the blade. The remaining part of the weight could be carried by the control line. In one embodiment, the blade lifting crane carries the entire weight of the blade and the control line exclusively pulls the blade towards the rotor.

In one embodiment, the weight of the blade is carried by a combination between the blade lifting crane and the control line such that the percentage of the weight carried by the control line reduces from a start percentage when the distance from the blade root to the blade flange is large, e.g. when the blade is on ground, to a lower end percentage when the distance from the blade root to the blade flange is small, e.g. when the blade root reaches the blade flange.

A secondary crane, e.g. a nacelle crane, preferably a detachable or fixed jib-crane or boom crane or telescopic boom may be used as the control line guide.

The method may comprise the step of fixing said control line guide to the wind turbine structure, e.g. to a nacelle or tower of the wind turbine, prior to mounting said blade. The method may further comprise the step of removing said control line guide from said wind turbine structure after mounting said blade.

The control line extends between said blade and said control line point. At the blade, the control line can be fixed e.g. directly to the blade. As an example, the control line can be tied around the root end of the blade.

At the blade, the control line can also be fixed to a control line holder which is again fixed to the blade. In one embodiment, the method comprises the step of fixing the control line to a fixture which is used for lifting the blade by the external blade lifting crane, e.g. to a gripper which grips on opposite sides of the blade for the purpose of lifting the blade. In this way, the control line holder forms part of the blade-fixture by which the external blade lifting crane lifts the blade.

Additionally or alternatively, the control line holder could comprise a blade root guide fixed at the blade root.

In one embodiment, the control line holder comprises two parts, a first part forming part of the blade-fixture, and a second part forming a blade root guide fixed at the blade root. The method may therefore comprise the step of guiding the control line from the blade-fixture through a blade root guide at the root end and from the blade root guide to the control line point of the control line guide.

The blade root guide forms a point at which the control line is restrained at the blade root. The control line blade point may e.g. constitute a permanent fixing of the control line where the control line is prevented from moving relative to the blade root guide. Alternatively, the blade root guide may constitute a semi-permanent fixing in which the control line may move relative to the blade root guide. In one embodiment of a semi-permanent fixing, the control line is allowed to slide longitudinally relative to the blade root guide and in one embodiment, the control line is allowed to be released completely from the blade root guide, e.g. by pulling in a specific direction. This may facilitate easy detachment of the control line from the blade root guide.

In one embodiment of the semi-permanent fixing, the blade root guide is configurable between a fixed configuration where the control line is completely fixed at the blade root guide and a released configuration where the control line can move longitudinally relative to the blade root guide and a loose configuration where the control line can be pulled out of the blade root guide. The released configuration may further be provided with different levels of resistance against sliding of the control line relative to the blade root guide.

In one embodiment, the blade root guide is an eyelet or block through which the control line is guided.

The control line may be constituted by one or more wires or cables, e.g. steel-wires or robes. The control line may include different structures e.g. for sensing tension or for providing gearing. E.g. for that purpose, the control line may include one or more blocks or pulleys with a loop of wire or robe extending between the block(s).

While the blade is lifted by the external blade lifting crane, the root end of the blade is guided towards the rotor by use of said control line. For the purpose of guiding the root end of the blade, the length of the control line between the control line point and the blade root end may be shortened, e.g. by winding up the control line on a winch. The winch may be located at the blade or at the wind turbine structure.

If the winch is located at the wind turbine structure, it may e.g. form part of control line guide. Accordingly, the method may comprise the step of providing the control line guide with a winch. In this case, the control line point may be provided such that it allows the control line to slide longitudinally through the control line point.

If the winch is located at the blade, it may form part of the aforementioned control line holder, particularly to the mentioned blade-fixture by which the external blade lifting crane lifts the blade.

The tension in the control line may be measured constantly or intermittently, and a threshold tension could be defined. If the tension in the control line reaches the threshold, the control line could be slackened, e.g. by controlled operation of the winch or by release of the control line from the hold structure or from the blade. In that way, excessive forces on the blade lifting crane and/or on the wind turbine structure may be prevented. On the contrary, if the tension is too low, the control line could be tightened.

In one embodiment, the control line is controlled, e.g. by controlling said winch, to maintain a specific first tension threshold, e.g. to provide a pull of a specific weight, e.g. 500 kg. Additionally or alternatively, a specific second tension threshold may be defined which should not be exceeded.

The control line may be controlled:

a) to be winded up (shortened) if the actual tension is below the first tension threshold, and/or b) to be un-winded (extended) if the actual tension is above the second tension threshold.

According to control principle a), the control line maintains a steady pull in the blade and thereby supports in keeping the blade in a desired orientation while the blade is mounted.

According to control principle b), the control line is released at least partly if excessive forces are experienced.

The first tension thresholds may e.g. constitute between 10 and 99 percent of the second threshold.

When the root end of the blade is close to the rotor, it may be an advantage to facilitate a pull directly towards the blade flange of the rotor, i.e. the flange where the blade root is to be connected. For this purpose, the method may further comprise the step of attaching an additional control line between a hold structure at the wind turbine rotor and the blade and to use the additional control line for guiding the root end of the blade towards a blade flange on the rotor, i.e. for guiding the blade during the final movement onto the blade flange.

The blade flange is a flange on the rotor which the blade root is attached. It could e.g. be constituted by a bearing ring of a blade bearing, e.g. the inner ring or outer ring of a blade bearing.

The additional control line is attached between said blade and said hold structure at the blade flange. The hold structure could be constituted by a hook or eyelet fixed to the rotor close to the blade flange, e.g. less than 20 cm. outside the blade flange, or it could be attached directly to the blade flange. The hold structure could also be located inside the rotor. In this embodiment, the additional control line is wired from the blade into the rotor through a hole, e.g. in the blade flange or in an outer ring of a blade bearing or in a stiffening plate within the inner ring of the blade bearing. In one embodiment, the blade root end comprises a flange with a plurality of bolts. Each of these bolts is received in a hole in the rotating ring of the blade bearing, e.g. the inner ring or outer ring. In this embodiment, one of the bolts in the blade root end could be removed, and the additional control line attached in replacement of the bolt. This additional control line could be threaded through that hole of the blade bearing which was intended to receive the removed bolt. In that way, the blade could be pulled more precisely towards the correct location on the blade bearing. When the blade is mounted, the additional control line could be replaced with a bolt inserted into the blade through the blade bearing, i.e. inserted from inside the rotor into the blade.

In one embodiment, the blade flange joins with the blade root along an axial end face, and the hold structure is attached to a radially, peripheral, outer surface of the blade flange, e.g. vertically above the axial end face on which the blade is received. In this way, the blade root can be guided by the additional control line all the way towards the blade flange until the blade root of the blade joins the axial end face of the blade flange.

In one embodiment, the blade flange is constituted by an inner ring of a blade bearing. In this embodiment, the hold structure may e.g. be a hook or other structure allowing attachment of the additional control line to the outer ring of the blade bearing.

In one embodiment, the blade flange is constituted by an outer ring of a blade bearing. In this embodiment, the hold structure may be located e.g. inside the rotor and the control line could be passed through the central opening within the blade bearing.

In certain embodiments, the rotor comprises a hub arranged inside a spinner. In this case, the blade flange may be located in a cavity formed by a spinner arranged about the hub. For pulling the blade root end into the cavity, it may be an advantage if the additional control line is fixed inside the cavity, e.g. on a side surface of the cavity, or in the bottom of the cavity, e.g. on the aforementioned blade flange.

Eventually, the control line and the primary lifting cable are released or uncoupled from the wind turbine blade.

At the same time, the control line guide could be released from the wind turbine structure and lowered to the ground.

The position of the control line point relative to the attachment location, and/or the winch and/or the release of the control line, and/or the additional control line, and/or the lifting cable may be remotely controlled, e.g. from within the rotor or from the blade lifting crane.

In a second aspect the present disclosure provides a method for removing a blade (12) from a wind turbine rotor (10) carried by a wind turbine structure, the method comprising:

providing a control line guide (9) at the wind turbine structure, the control line guide forming a control line point (15);

attaching a control line (14) between the control line point (15) and the blade (12);

disconnecting said blade from said rotor; and lifting the blade with an external blade lifting crane (11) while a root end of the blade is guided away from the rotor (7) by use of said control line.

The method may include any of the features and steps mentioned relative to the method of mounting a blade on a wind turbine.

In a third aspect the present disclosure provides a lifting arrangement for mounting a blade on a wind turbine rotor which is carried by a wind turbine structure, the arrangement comprising:

a control line guide attachable to the wind turbine structure, the control line guide forming a control line point configured to restrain a control line, a control line holder attachable to the wind turbine blade, a control line connecting the control line guide and the control line holder a blade-fixture for lifting the blade with a blade lifting crane, and a winch arranged to shorten the length of the control line between the control line point and the control line holder.

The winch may form part of the blade-fixture or the control line guide, and it may be powered e.g. via the blade lifting crane to thereby allow the person operating the blade lifting crane to operate the winch.

To control release of the control line from the blade once the blade is mounted, the lifting arrangement may comprise a control line-release-structure by which the control line can released from the blade or from the control line guide.

The control line holder may form part of the blade-fixture and it may further comprise a blade root guide which is attachable to the blade root. The winch may be attached to the blade-fixture.

In a fourth aspect the present disclosure provides a method for mounting a blade on a wind turbine rotor carried by a wind turbine structure, the method comprising:

providing a secondary crane carried by the wind turbine structure, the secondary crane defining a control point;

attaching a tag-line between the control point and the blade;

lifting the blade with an external blade lifting crane while a root end of the blade is guided towards the rotor by use of said tag-line, and connecting said blade to said rotor, wherein the weight of the blade is carried exclusively by the external blade lifting crane.

The secondary crane may particularly be a nacelle crane, e.g. fixed to the roof of the nacelle. The secondary crane could be attached preliminary to the nacelle only for the purpose of guiding the blade during blade installation. Accordingly, the disclosure provides the use of a wind turbine internal crane for guiding a tag-line during a blade installation procedure where the blade is carried by an external crane.

BRIEF DESCRIPTION OF THE DRAWINGS

The invention will now be described in further detail with reference to the accompanying drawings in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
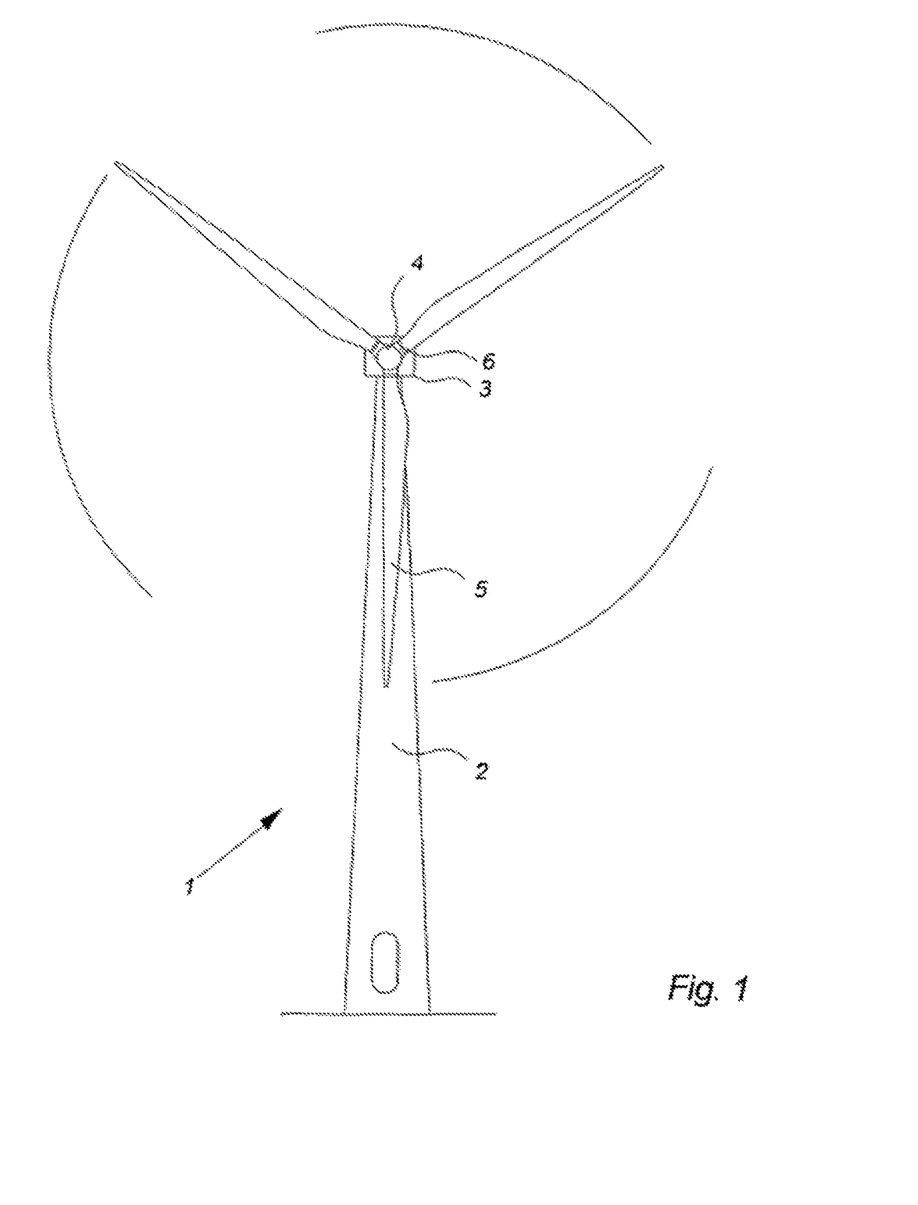
FIG. 1 illustrates a wind turbine comprising a tower, a nacelle, a rotor and blades attached to the rotor.

FIG. 1 illustrates a modern wind turbine 1 with a tower 2 and a wind turbine nacelle 3 positioned on top of the tower. The wind turbine rotor, comprising at least one blade such as three wind turbine blades 5 as illustrated, is connected to the hub 4 through pitch mechanisms 6. Each pitch mechanism includes a blade bearing and pitch actuating means which allows the blade to pitch. The pitch process is controlled by a pitch controller.

Figure 2:
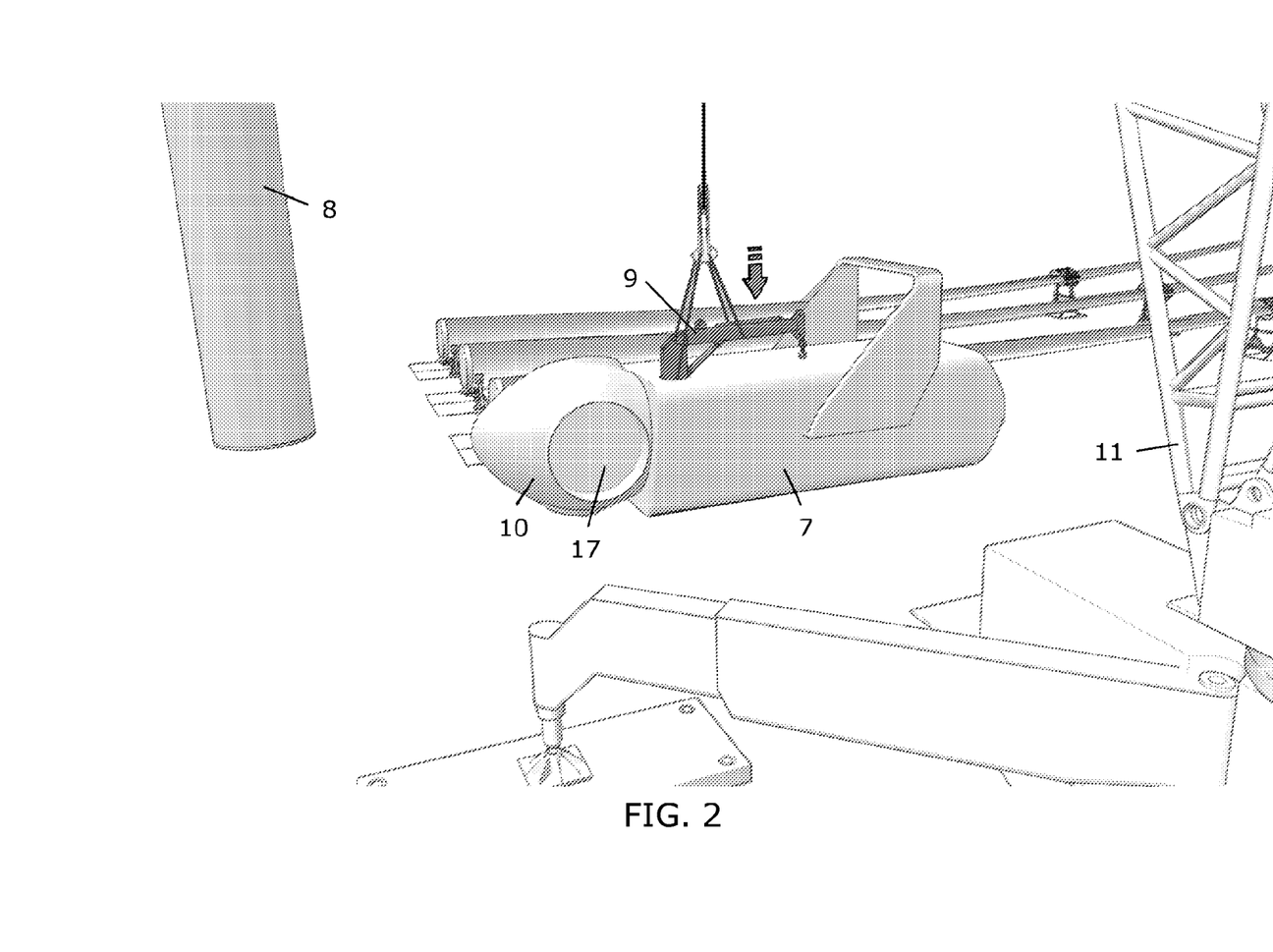
FIGS. 2-8 illustrate a sequence of steps carried out during mounting of a blade.

FIG. 2 illustrates a nacelle 7 for wind turbines to be assembled. The tower 8 is assembled in a previous assembly procedure. A lifting arrangement with a control line guide 9 in the form of a nacelle crane is lifted onto the roof of one of the nacelles 7 by use of an external crane 11. The nacelle crane which constituted the control line guide comprises a winch for winding up the control line, and a tag-tag line which is later to be attached to the root of the blade which is to be installed. The nacelle crane is fixed to the nacelle roof such that it can later be detached and used during assembly of another wind turbine. The nacelle carries the rotor 10 forming a blade flange 17 on which the blade is to be mounted.

Figure 3:
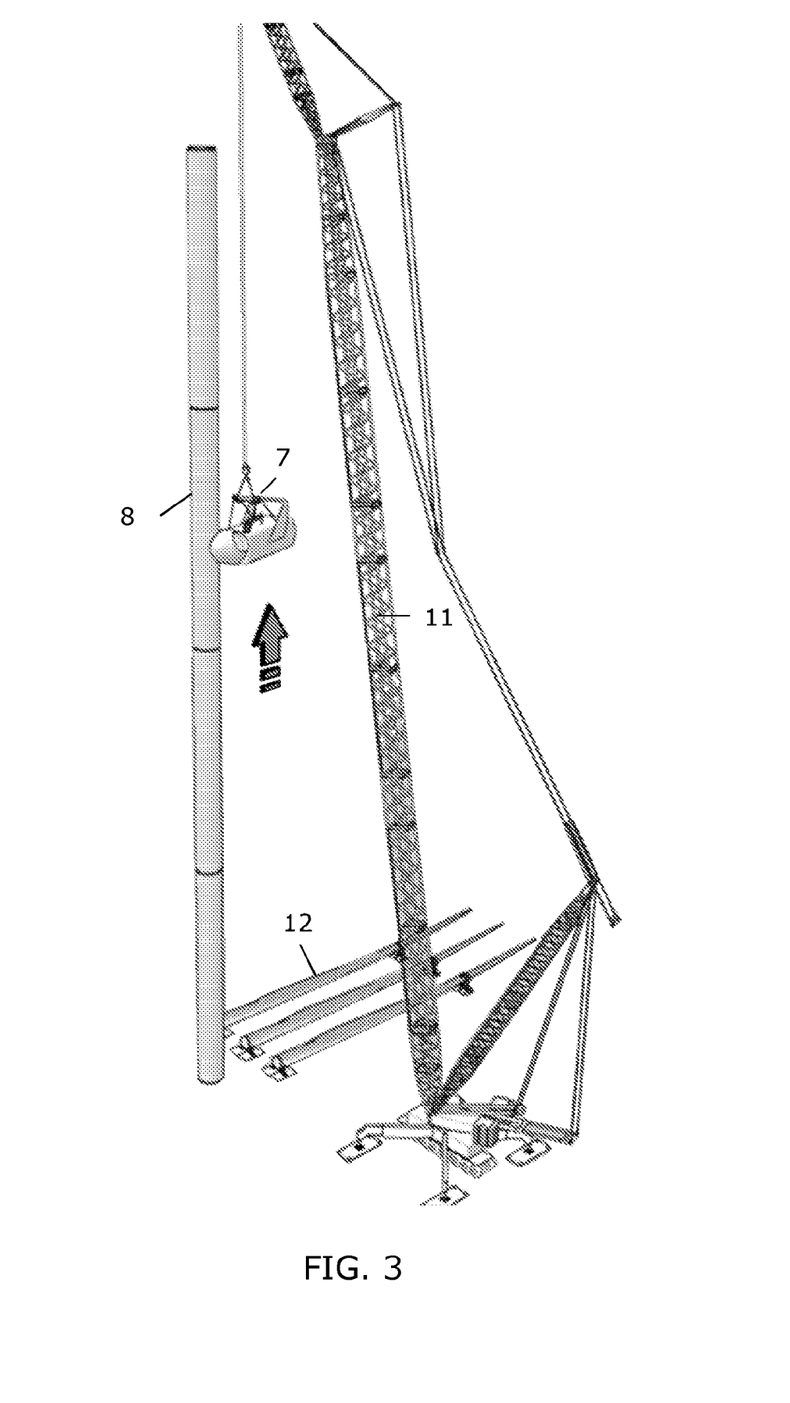

FIG. 3 illustrates the use of the external blade lifting crane 11 for lifting the nacelle 7 to the top of the tower 8. The external blade lifting crane thereby positions the nacelle and the control line guide simultaneously on the tower. The blades 12 are ready on the ground.

Figure 4:
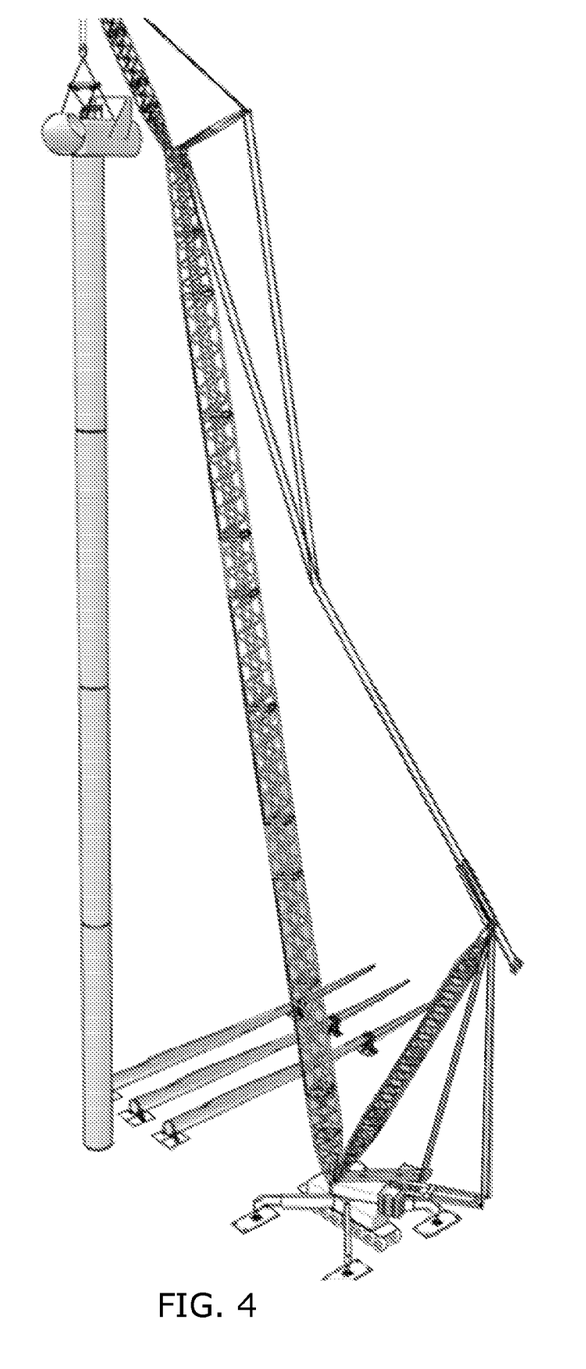

FIG. 4 illustrates the nacelle with the control line guide on top of the tower.

Figure 5:
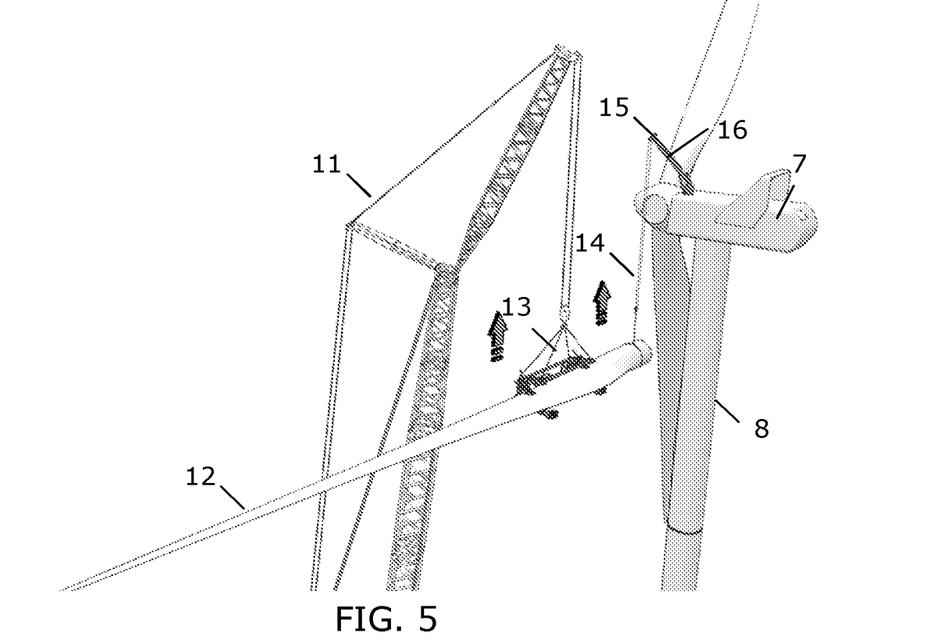

FIG. 5 illustrates a blade 12 lifted by the external crane 11 by use of the blade-fixture 13. A control line 14 is stretched from a control line point 15 at the end of the nacelle crane arm 16 to the root end of the blade. At the same time, the external blade lifting crane 11 is attached to the blade 12 and the blade is ready to be lifted. The control line could be fixed to the root end of the blade already before the nacelle is lifted and mounted on the tower, or it could be pulled down from the control line guide e.g. by use of the external blade lifting crane when the nacelle is mounted on the tower.

Figure 6:
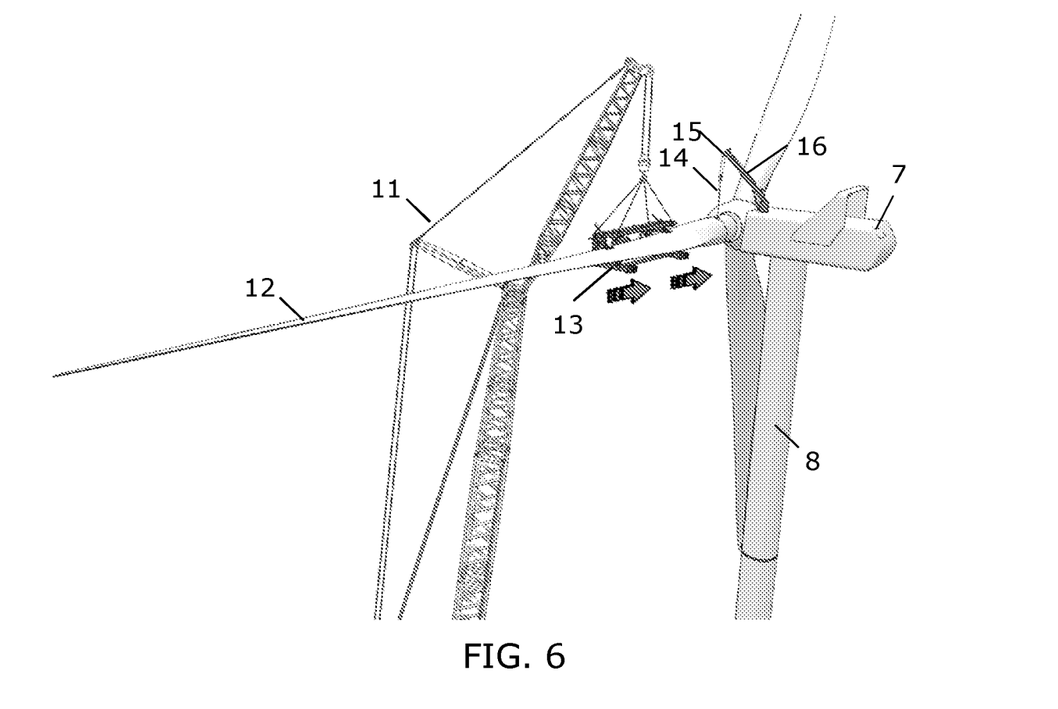
Figure 7:
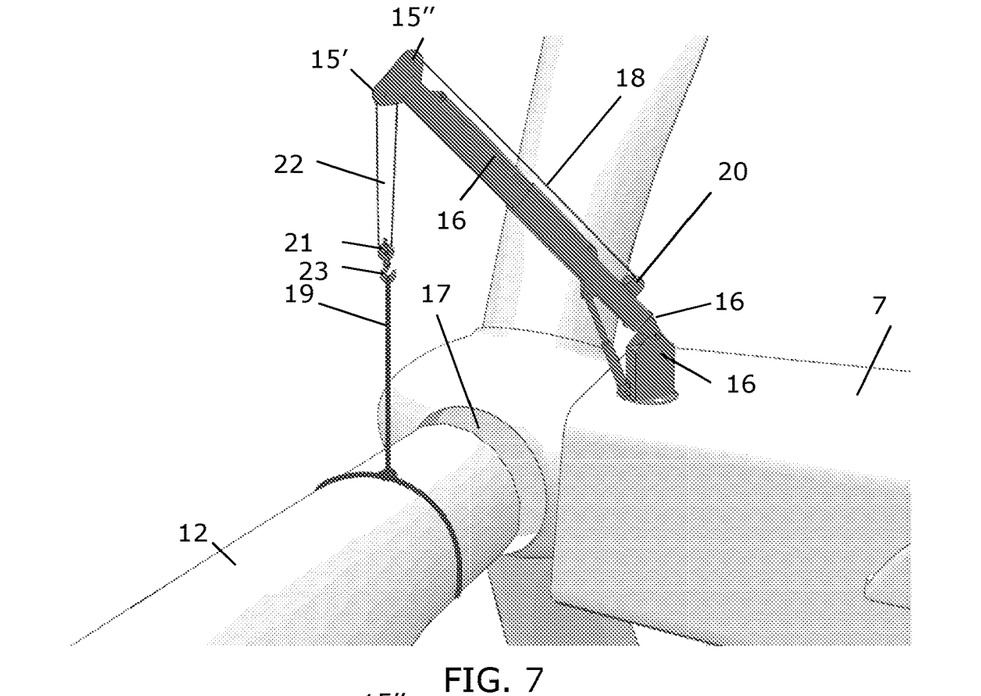

FIG. 6 illustrates that the blade is lifted to the top of the tower, and the root end of the blade is positioned at the rotor by use of the control line carried by the nacelle crane. In this step of the mounting procedure, the control line point 15 has been moved relative to the nacelle. The movement of the control line point enables the blade to be lifted with a safety distance from the wind turbine structure and when the blade arrives at the top, the root end of the blade can be pulled closer towards the rotor to facilitate the mounting of the blade. The blade is attached to the rotor in a position where the blade has its primary axis essentially horizontally, and where the blade flange 17 (c.f. FIG. 7) on which the blade is attached is essentially vertical, i.e. in a 3 o'clock position.

FIG. 7 illustrates an enlarged view of the nacelle crane which constitutes the control line guide. In the illustrated embodiment, the control line is constituted by a first control line section 18 and an additional control line section 19.

At the end of the nacelle crane arm 16, the nacelle crane forms a control line point 15. The control line point in this embodiment is constituted by an eyelet 15' at which the first control line section is attached and a block 15" through which the first control line section is passed to the winch 20. Between the eyelet 15' and the block 15", the first control line section is passed through a block 21. The first control line section thereby forms a 1:2 gearing by the double line section 22. The block 21 carries a hook 23. The hook 23 carries the additional control line section 19 which is tied around the root end of the blade 12.

Figure 8:
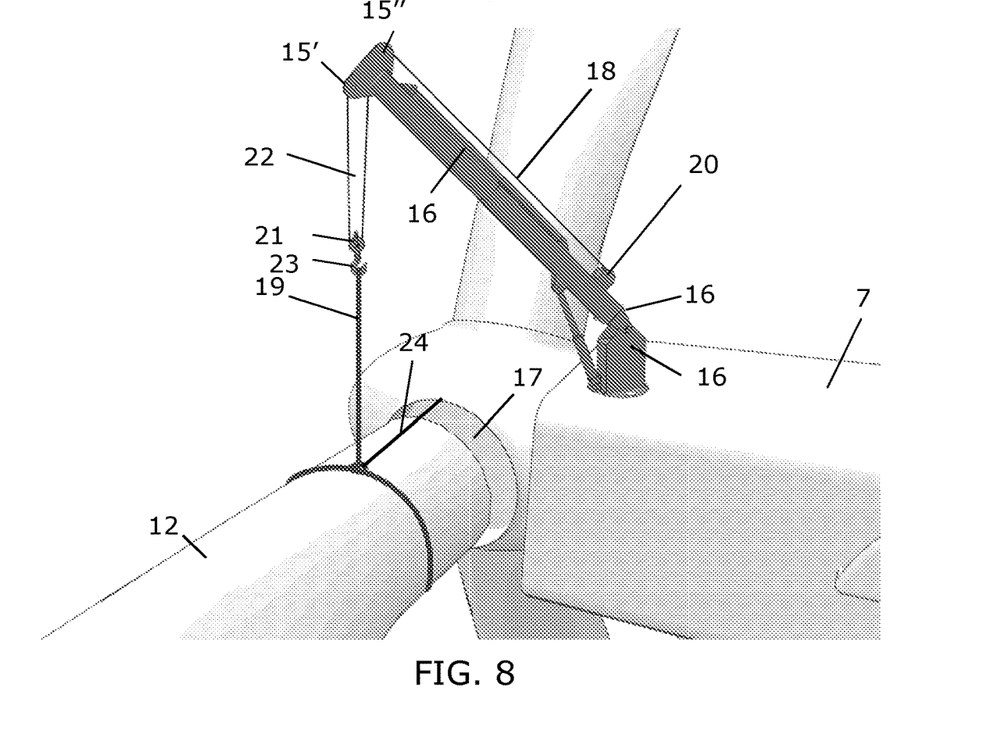

FIG. 8 illustrates essentially the same procedure as FIG. 7 but in this case, an additional control line 24 is attached between the blade and the blade flange 17. The additional control line enables a pull directly towards the blade flange and thereby facilitates the blade mounting particularly during the last part of the blade movement towards the blade flange. The additional control line could be shortened e.g. by use of a winch, e.g. located inside the rotor.

The embodiments described above are merely examples of the invention defined by the claims that appear below. Persons skilled in the technical field of handling wind turbine components and mounting blades will appreciate additional examples, modifications, and advantages based on the description. For example, the structure of the control line guide, the control line holder, and the blade-fixture may deviate from the illustration.

The invention claimed is:

1. A method for mounting a blade on a wind turbine rotor carried by a nacelle, the method comprising:
   providing a control line guide at the nacelle, the control line guide fixed to an outer surface of the nacelle, the control line guide forming a control line point;
   attaching a control line between the control line point and the blade;
   lifting the blade with an external blade lifting crane while a root end of the blade is guided towards the rotor by use of said control line, and
   connecting said blade to said rotor.

2. The method according to claim 1, wherein the control line guide is fixed to an attachment location of the nacelle and wherein the control line guide is provided such that it allows repositioning of the control line point relative to the attachment location.

3. The method according to claim 2, wherein the position of the control line point is changed during the lifting of the blade.

4. The method according to claim 1, wherein the external blade lifting crane carries the weight of the blade.

5. The method according to claim 1, wherein the control line guide is configured to carry a part of the weight of the blade.

6. The method according to claim 5, wherein the control line guide carries a percentage of the weight of the blade, the percentage changing based on the distance from the root end to a blade flange.

7. The method according to claim 1, wherein a secondary crane is used as the control line guide.

8. The method according to claim 1, comprising fixing said control line guide to said nacelle prior to mounting said blade and removing said control line guide from said nacelle after mounting said blade.

9. The method according to claim 1, wherein the control line is attached to the blade by attaching a control line holder to the blade and attaching the control line to the control line holder.

10. The method according to claim 9, wherein said control line holder forms part of a blade-fixture by which the external blade lifting crane lifts the blade.

11. The method according to claim 9, wherein said control line holder is provided with a blade root guide at said root of said blade and where the control line is guided from the blade root guide to the control line point.

12. The method according to claim 1, comprising the step of attaching an additional control line between the wind turbine rotor and the blade and using the additional control line for guiding the root end of the blade towards a blade flange on the rotor.

13. The method according to claim 12, wherein the additional control line is attached to the blade flange.

14. A method for removing a blade from a wind turbine rotor carried by a nacelle, the method comprising:
   providing a control line guide at the nacelle, the control line guide fixed to an outer surface of the nacelle, the control line guide forming a control line point;
   attaching a control line between the control line point and the blade;
   disconnecting said blade from said rotor; and
   lifting the blade with an external blade lifting crane while a root end of the blade is guided away from the rotor by use of said control line.

15. A lifting arrangement for mounting a blade on a wind turbine rotor which is carried by a nacelle, the arrangement comprising:
- a control line guide attachable to the nacelle, the control line guide fixed to an outer surface of the nacelle, the control line guide forming a control line point configured to restrain a control line,
- a control line holder attachable to the wind turbine blade;
- the control line connecting the control line guide and the control line holder;
- a blade-fixture for lifting the blade with a blade lifting crane; and
- a winch arranged to shorten the length of the control line between the control line point and the control line holder.

16. The lifting arrangement according to claim 15, wherein the winch forms part of the blade-fixture.

17. The lifting arrangement according to claim 15, wherein the control line holder forms part of the blade-fixture.

18. The lifting arrangement according to claim 15, wherein the control line holder comprises a blade root guide attachable to the blade root.

19. A method for mounting a blade on a wind turbine rotor carried by a wind turbine structure, the method comprising:
- providing a secondary crane carried by the wind turbine structure, the secondary crane defining a control point;
- attaching a tag-line between the control point and the blade;
- lifting the blade with an external blade lifting crane while a root end of the blade is guided towards the rotor by use of said tag-line, and
- connecting said blade to said rotor,
- wherein the weight of the blade is carried exclusively by the external blade lifting crane.

* * * * *